United States Patent
Lee et al.

(10) Patent No.: US 8,842,567 B2
(45) Date of Patent: Sep. 23, 2014

(54) METHOD AND APPARATUS FOR PERFORMING RANDOM ACCESS PROCEDURES IN A WIRELESS COMMUNICATION SYSTEM

(75) Inventors: Young Dae Lee, Anyang-si (KR); Sung Hoon Jung, Anyang-si (KR); Seung June Yi, Anyang-si (KR); Sung Duck Chun, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 95 days.

(21) Appl. No.: 13/643,994

(22) PCT Filed: Apr. 27, 2011

(86) PCT No.: PCT/KR2011/003083
§ 371 (c)(1),
(2), (4) Date: Oct. 26, 2012

(87) PCT Pub. No.: WO2011/136558
PCT Pub. Date: Nov. 3, 2011

(65) Prior Publication Data
US 2013/0034059 A1    Feb. 7, 2013

Related U.S. Application Data

(60) Provisional application No. 61/330,388, filed on May 2, 2010, provisional application No. 61/329,072, filed on Apr. 28, 2010, provisional application No. 61/471,664, filed on Apr. 4, 2011.

(51) Int. Cl.
*H04W 92/00* (2009.01)
*H04W 74/00* (2009.01)
*H04W 4/00* (2009.01)
*H04W 74/08* (2009.01)

(52) U.S. Cl.
CPC ............ *H04W 74/006* (2013.01); *H04W 4/005* (2013.01); *H04W 74/0833* (2013.01)
USPC .......................................................... 370/252

(58) Field of Classification Search
None
See application file for complete search history.

(56) References Cited

U.S. PATENT DOCUMENTS

| | | | |
|---|---|---|---|
| 7,248,568 B1 | 7/2007 | Loc et al. | |
| 7,489,666 B2 | 2/2009 | Koo et al. | |
| 7,848,346 B2 * | 12/2010 | Park et al. | 370/448 |
| 7,979,769 B2 * | 7/2011 | Chun et al. | 714/748 |
| 8,027,656 B2 * | 9/2011 | Rofougaran et al. | 455/316 |
| 8,040,913 B2 * | 10/2011 | Lee et al. | 370/445 |
| 8,285,286 B2 * | 10/2012 | Lee et al. | 455/436 |
| 8,493,994 B2 * | 7/2013 | Park et al. | 370/448 |
| 8,599,706 B2 * | 12/2013 | Damnjanovic et al. | 370/252 |

(Continued)

FOREIGN PATENT DOCUMENTS

WO    WO2010143846    * 12/2010    ............. H04J 11/00

*Primary Examiner* — Jay P Patel
(74) *Attorney, Agent, or Firm* — Birch, Stewart, Kolasch & Birch, LLP

(57) ABSTRACT

Provided are a method and apparatus in which user equipment performs random access procedures in a wireless communication system. More particularly, an embodiment is provided in which a first type backoff parameter and a second type backoff parameter are provided from a base station. The backoff parameter is transmitted from the base station before the user equipment transmits a first random access preamble to the base station. The first type backoff parameter and the second type backoff parameter are included in a random access response.

18 Claims, 11 Drawing Sheets

(56) References Cited

U.S. PATENT DOCUMENTS

| | | | |
|---|---|---|---|
| 2009/0259910 A1* | 10/2009 | Lee et al. | 714/748 |
| 2010/0202288 A1* | 8/2010 | Park et al. | 370/230 |
| 2010/0232318 A1* | 9/2010 | Sarkar | 370/254 |
| 2010/0232364 A1* | 9/2010 | Hsu | 370/328 |
| 2010/0238859 A1* | 9/2010 | Vukovic et al. | 370/328 |
| 2010/0255847 A1* | 10/2010 | Lee et al. | 455/436 |
| 2010/0309877 A1* | 12/2010 | Damnjanovic et al. | 370/331 |
| 2011/0039541 A1* | 2/2011 | Park et al. | 455/422.1 |
| 2011/0116364 A1* | 5/2011 | Zhang et al. | 370/216 |
| 2011/0216705 A1* | 9/2011 | Lee et al. | 370/328 |
| 2011/0222498 A1* | 9/2011 | Chun et al. | 370/329 |
| 2012/0002606 A1* | 1/2012 | Vujcic | 370/328 |
| 2012/0051297 A1* | 3/2012 | Lee et al. | 370/329 |
| 2012/0076126 A1* | 3/2012 | Yi et al. | 370/338 |
| 2013/0077485 A1* | 3/2013 | Bai et al. | 370/230 |

* cited by examiner

METHOD AND APPARATUS FOR PERFORMING RANDOM ACCESS PROCEDURES IN A WIRELESS COMMUNICATION SYSTEM

This application is the National Phase of PCT/KR2011/003083 filed on Apr. 27, 2011, which claims priority under 35 U.S.C. 119(e) to U.S. Provisional Application No. 61/329,072 filed on Apr. 28, 2010, U.S. Provisional Application No. 61/330,388 filed on May 2, 2010 and U.S. Provisional Application No. 61/471,664 filed on Apr. 4, 2011, all of which are hereby expressly incorporated by reference into the present application.

TECHNICAL FIELD

The present invention relates to wireless communications and, more particularly, to a method and apparatus for MTC (Machine-Type Communication) in a wireless communication system.

BACKGROUND ART

MTC (Machine-Type Communication) is a type of data communications including one or more entities not requiring human interaction. Namely, MTC refers to a concept that machines, rather than terminals (or user equipments (UEs)) used by humans, communicate with each other by using an existing wireless communication network. A machine used for MTC may be called an MTC device, and MTC devices include various devices such as a vending machine, a machine measuring a water level of a dam, and the like.

An MTC device has different characteristics from those of a general terminal, so a service optimized for MTC may be different from a service optimized for human-to-human communications. Compared to a current mobile network communication service, MTC may be characterized by mutually different market scenarios, data communication low costs and efforts, a potentially large number of communication terminals, wide service coverage, low The number of MTC devices supported by a single base station is expected to be much greater than the number of terminals. Due to general M2M (Machine to Machine) service characteristics, communication is highly likely to be simultaneously performed on a plurality of MTC devices.

DISCLOSURE

Technical Problem

Thus, there is a possibility that network resources are insufficient, and a technique for effectively handling network signaling loads for MTC devices is required.

Technical Solution

An embodiment of the present invention provides a method and apparatus for MTC (Machine-Type Communication) in a wireless communication system.

An embodiment provides a method for performing a random access procedure by a user equipment in a wireless communication system. The method may include: transmitting a first random access preamble to a base station; receiving first backoff parameter from the base station; and transmitting a second random access preamble to the base station, wherein the second random access preamble is transmitted by using the first backoff parameter information, and the first backoff parameter information is classified into a first type backoff parameter and a second type backoff parameter.

In detail, the method may further include receiving the second backoff parameter from the base station, wherein the second backoff parameter information is received before the first random access preamble is transmitted to the base station, and the second backoff parameter information is classified into a first type backoff parameter and a second type backoff parameter.

In detail, the second backoff parameter information may be included in a random access response.

In detail, the first random access preamble is a first random access preamble transmitted by a user equipment (UE).

In detail, the first backoff parameter information may be included in a random access response received in response to the first random access preamble.

In detail, the first type backoff parameter may be used for cell-common backoff, and the second type backoff parameter may be used for particular cause-dedicated backoff (i.e., cause-specific backoff).

In detail, the particular cause-dedicated backoff may be used when an establishment cause included in an RRC (Radio Resource Control) connection request message is at least one of MTC (machine type communication) and low priority.

In detail, the establishment cause may be indicated in a NAS (non-access stratum) layer.

In detail, the first backoff parameter information may be included in a MAC (Medium Access Control) PDU (Protocol Data Unit) of the random access response.

In detail, the first type backoff parameter may be included in a first subheader of a MAC header, and the second type backoff parameter may be included in a second subheader of the MAC header.

In detail, the first type backoff parameter may be included in the subheader of the MAC header, and the second type backoff parameter may be included in a padding field that follows a MAC payload of the MAC PDU.

In detail, the first backoff parameter information may be included in a system information block (SIB) or a paging message transmitted by the base station.

In detail, the second random access preamble may be transmitted based on a delay time selected by a uniform distribution between 0 and a parameter value indicated by the first backoff parameter information.

Another embodiment provides a method including: receiving a first random access preamble from a user equipment (UE); transmitting first backoff parameter information to the UE; and receiving a second random access preamble from the UE, wherein the first backoff parameter information is used to transmit the second random access preamble by the UE, and the second backoff parameter is classified into first type backoff parameter and a second type backoff parameter.

In detail, the method may further include: transmitting second backoff parameter information, wherein the second backoff parameter information may be transmitted before the first random access preamble is received from the UE, and the second backoff parameter information may be classified into the first type backoff parameter and the second type backoff parameter.

In detail, the second backoff parameter information may be included in a random access response.

In detail, the first random access preamble may be a first random access preamble received by the UE.

In detail, the first backoff parameter information may be included in the random access response transmitted by the base station in response to the first random access preamble.

In detail, the first type backoff parameter may be used for cell-common backoff, and the second type backoff parameter may be used for particular cause-dedicated (i.e., cause-specific) backoff.

In detail, the particular cause-dedicated backoff may be used when an establishment cause included in an RRC (Radio Resource Control) connection request message is at least one of MTC (machine type communication) and low priority.

In detail, the first backoff parameter information may be included in a MAC (Medium Access Control) PDU (Protocol Data Unit) of the random access response.

In detail, the first type backoff parameter may be included in a first subheader of a MAC header, and the second type backoff parameter may be included in a second subheader of the MAC header.

In detail, the first type backoff parameter may be included in the subheader of the MAC header, and the second type backoff parameter may be included in a padding field that follows a MAC payload of the MAC PDU.

In detail, the first backoff parameter information may be included in a system information block (SIB) or a paging message transmitted by the base station.

Advantageous Effects

In the method and apparatus according to embodiments of the present invention, since a cell-common backoff parameter and a particular cause-dedicated parameter are classified, a delay time according to a random access can be reduced.

MODE FOR INVENTION

Embodiments of the present invention will now be described in detail.

Figure 1:
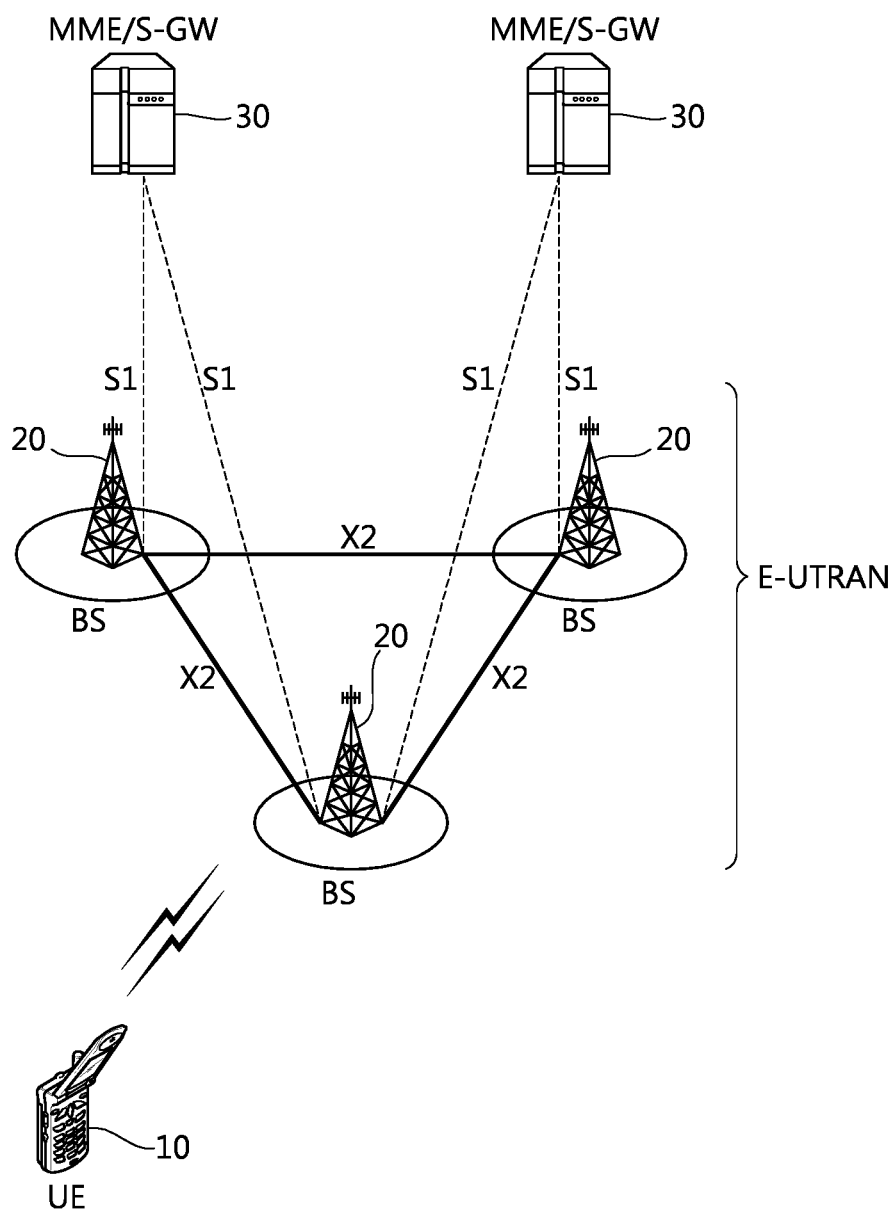
FIG. 1 is a wireless communication system to which an embodiment of the present invention is applied.

FIG. 1 is a wireless communication system to which an embodiment of the present invention is applied. It may be called an E-UTRAN (Evolved-UMTS Terrestrial Radio Access Network), or an LTE (Long Term Evolution)/LTE-A system.

An E-UTRAN includes a base station (BS) 20 that provides a control plane and a user plane to a user equipment (UE) 10. The UE 10 may be fixed or mobile, and may be referred to by other name, such as a mobile station (MS), a user terminal (UT), a subscriber station (SS), a wireless device, or the like. The BS 20 generally refers to a fixed station that communicates with the UE 10 and may be called by other name, such as an eNB (evolved-Node B), a BTS (Base Transceiver System), an access point, or the like.

The BSs 20 may be connected with each other via an X2 interface. The BS 20 is connected to an EPC (Evolved Packet Core) 30 via an S1 interface. Specifically, the BSs 20 are connected to an MME (Mobility Management Entity) via S1-MME and to an S-GW (Serving Gateway) via S1-U.

The EPC 30 includes an MME, an S-GW, and a P-GW (Packet Data Network-Gateway). The MME retains information regarding a UE access or information regarding UE capability, and such information is largely used to manage UE mobility. The S-GW is a gateway having an E-UTRAN as a terminal point and the P-GW is a gateway having a PDN as a terminal point.

A radio interface between a UE and a BS is called a Uu interface. Layers of the radio interface protocols between a UE and a network may be divided into a first layer L1, a second layer L2, and a third layer L3 based on the three lower layers of an open system interconnection (OSI) standard model widely known in communication systems. The physical layer belonging to the first layer (L1) provides an information transfer service using a physical channel, and an RRC (Radio Resource Control) layer positioned in the third layer serves to control radio resources between the UE and the network. To this end, the RRC layer exchanges an RRC message between the UE and the network.

Figure 2:
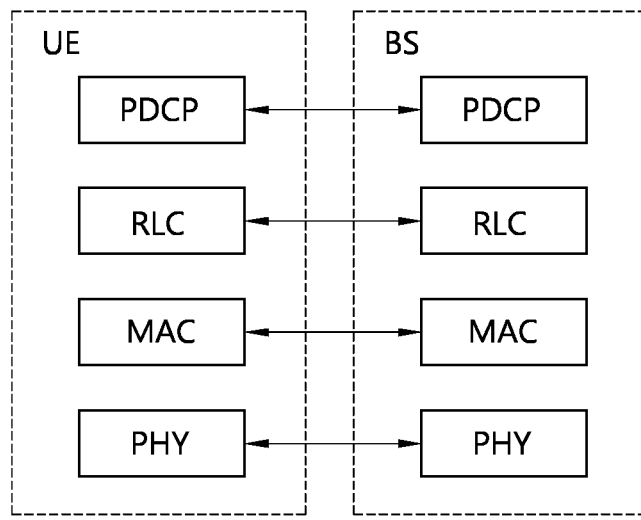
FIG. 2 is a block diagram showing a radio protocol architecture with respect to a user plane.
Figure 3:
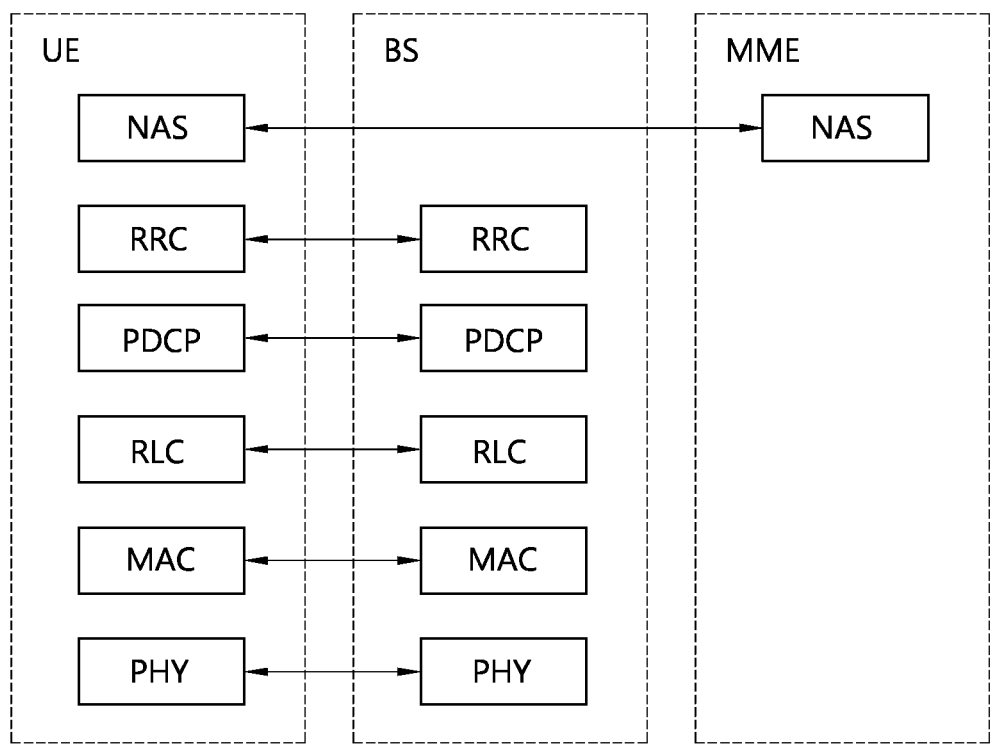
FIG. 3 is a block diagram showing a radio protocol architecture with respect to a control plane.

FIG. 2 is a block diagram showing a radio protocol architecture with respect to a user plane. FIG. 3 is a block diagram showing a radio protocol architecture with respect to a control plane. The user plane is a protocol stack for transmitting user data, and the control plane is a protocol stack for transmitting a control signal.

Referring to FIGS. 2 and 3, the physical layer provides an information transfer service to an upper layer by using a physical channel. The physical layer is connected to a medium access control (MAC) layer via a transport channel. Data is transferred between the MAC layer and the physical layer via the transport channel. Transport channels are classified depending on how and with what kind of characteristics data is transmitted through a radio interface Between different physical layers, namely, between physical layers of a transmitter and a receiver, data is transferred via the physical channel. The physical channel may be modulated according to an OFDM (Orthogonal Frequency Division Multiplexing) scheme, and time and frequency may be utilized as radio resources.

Functions of the MAC layer include mapping between a logical channel and a transport channel and multiplexing/demultiplexing an MAC SDU (service data unit) belonging to a logical channel into a transport block belonging to a physical channel via a transport channel. The MAC layer provides a service to an RLC (radio link control) layer through a logical channel.

Functions of the RLC layer include concatenation, segmentation, and reassembly of an RLC SDU. In order to guarantee various QoS (Quality of Service) required by a radio bearer (RB), the RLC layer provides three types of operation modes: a transparent mode (TM), an unacknowledged mode (UM), and an acknowledged mode (AM). An AM RLC provides an error correction through an ARQ (automatic repeat request).

A PDCP (Packet Data Convergence Protocol) layer in the user plane performs a transfer of a user data, header compression, and ciphering. Functions of the PDCP in the control plane include transfer of control plane data and ciphering/integrity protection.

The RRC (Radio Resource Control) layer is defined only in the control plane. The RRC layer handles controlling of a logical channel, a transport channel, and a physical channel in relation to configuration, re-configuration, and releasing of radio bearers (RBs).

RB refers to a logical path provided by the first layer (PHY layer) and the second layers (MAC layer, RLC layer, and PDCP layer) to transfer data between a UE and a network. Setting of an RF refers to defining characteristics of radio protocol layers and channels and configuring detailed parameters and operation methods to provide a particular service. RBs may be divided into two types: SRB (Signaling RB) and DRB (Data RB). The SRB is used as a passage for transmitting an RRC message on the control plane, and the DRB is used as a passage for transferring an RRC message on the user plane.

When there is an RRC connection between the RRC of the UE and that of the E-UTRAN, the UE is in an RRC-connected mode, or otherwise, the UE is in an RRC idle mode.

Downlink transport channels for transmitting data from the network to the UE includes a BCH (Broadcast Channel) for transmitting system information and a DL-SCH (Downlink-Shared Channel) for transmitting user traffic or a control message. Traffic or a control message of a downlink multicast or broadcast service may be transmitted via the DL-SCH or an extra downlink MCH (Multicast Channel). Meanwhile, uplink transport channels for transmitting data from the UE to the network includes an RACH (Random Access Channel) for transmitting an initial control message and a UL-SCH (Uplink-Shared Channel) for transmitting user traffic or a control message.

Logical channels positioned at a higher level and mapped to a transport channel includes a BCCH (Broadcast Channel), a PCCH (Paging Control Channel), a CCCH (Common Control Channel), an MCCH (Multicast Control Channel), an MTCH (Multicast Traffic Channel), or the like.

A physical channel is comprised of several OFDM symbols in a time domain and several subcarriers in a frequency domain. A single subframe includes a plurality of OFDM symbols in the time domain. A resource bock is a resource allocation unit, which includes a plurality of OFDM symbols and a plurality of subcarriers. Each subframe may use particular subcarriers of particular OFDM symbols (e.g., first OFDM symbol) of a corresponding subframe for a PDCCH (Physical Downlink Control Channel), namely, for an L1/L2 control channel. A TTI (Transmission Time Interval) is a unit time of a subframe transmission.

Hereinafter, an RRC state and an RRC connection method will be described.

An RRC state refers to whether or not an RRC layer of a UE is logically connected to that of the E-UTRAN. When the RRC layer of the UE is logically connected to that of the E-UTRAN, it is called an RRC connected state, and or otherwise, it is called an RRC idle state. When the UE is in the RRC connected state, since the RRC connection exists, the E-UTRAN can recognize the presence of the corresponding UE by cell, and thus, the E-UTRAN can effectively control the UE. Meanwhile, when the UE is in the RRC idle state, the E-UTRAN cannot recognize the UE in the RRC idle state, and the UE is managed by a core network (CN) by track area unit larger than a cell. Namely, the UE in the RRC idle state is recognized as to whether or not it is present by the larger area unit, and in order for the UE in the RRC idle state to receive a general mobile communication service such as a voice or data, the UE in the RRC idle state is to be changed to the RRC connected state.

When the user first turns on power of a UE, the UE first searches for an appropriate cell and remains in an RRC idle state in the corresponding cell. When the UE in the RRC idle state is required to be RRC connected, the UE establishes an RRC connection with the E-UTRAN through an RRC connection procedure and transitions to the RRC connection state. When the UE in the RRC idle state may need to establish an RRC connection for various reasons. For example, the UE in the RRC idle state may establish an RRC connection when a transmission of uplink data is required as the user attempts to make a call, or the like, or when a response is required to be transmitted as a paging message is received from the E-UTRAN.

A NAS (Non-Access Stratum) layer positioned at a higher level of the RRC layer performs functions such as session management, mobility management, and the like.

In order for the NAS layer to manage mobility of the UE, two states of EMM-REGISTERED (EPS Mobility Management-REGISTERED) and EMM-DEREGISTERED are defined, and these two states are applied to a UE and an MME. Initially, the UE is in the EMM-DEREGISTERED state, and in order to access a network, the UE performs a process of registering the corresponding network through an initial attach procedure. When the attach procedure is successfully performed, the UE and the MME are in the EMM-REGISTERED state.

In order to manage a signaling connection between the UE and the EPC, two states of ECM (EPS Connection Management)-IDLE and an ECM-CONNECTED state are defined, and these two states are applied to the UE and the MME. When the UE in the ECM-IDLE state establishes an RRC connection with the E-UTRAN, the corresponding UE is in the ECM-CONNECTED state. When the MME in the ECM-IDLE state establishes an S1 connection with the E-UTRAN, the MME is in an ECM-CONNECTED state. When the UE is in the ECM-IDLE state, the E-UTRAN does not have information regarding context of the UE. Thus, the UE in the ECM-IDLE state performs a UE-based mobility related procedure such as cell selection or cell reselection without receiving a command of the network. Meanwhile, when the UE is in the ECM-CONNECTED state, mobility of the UE is managed by a command of the network. In the ECM-IDLE state, when a location of the UE is changed to be different from that known by the network, the UE informs the network about its location through a tracking area updating procedure.

Hereinafter, system information will be described. System information includes essential information for the UE to know in order to access a BS. Thus, the UE should receive all the system information before accessing a BS, and also, the UE should retain the latest system information all the time. Since system information is information every UE within a cell should know, the BS periodically transmits system information to UEs.

System information is divided into an MIB (Master Information Block), an SB (Scheduling Block), an SIB (System Information Block), and the like. The MIB allows the UE to know a physical configuration, e.g., a bandwidth, of a corresponding cell. The SB provides transmission information of SIBs, e.g., a transmission period, and the like. The SIB is a set of relevant system information. For example, a certain SIB includes only information regarding a neighboring cell, while a certain SIB includes only information regarding an uplink radio channel.

In order to inform the UE about whether or not system information has been changed, a BS transmits a paging message. In this case, the paging message includes a system information change indicator. The UE receives the paging message according to Paging DRX, and if the paging message includes the system information change indicator, the UE receives system information transmitted through a logical channel BCCH.

In an LTE system, a noncontention random access procedure allocating, by a BS, a designated (or dedicated) random access preamble to a particular UE and randomly accessing, by the UE, with the random access preamble is provided. In other words, the procedure of selecting a random access preamble includes a contention-based random access procedure that a UE randomly selects one random access preamble from a particular set and uses the same and a noncontention-based random access procedure that a UE uses a random access preamble allocated thereto. A difference between the two random access procedures lies in a generation of collision due to contention as described hereinafter. The noncontention-based random access procedure may be used only when the foregoing handover process is performed or when it is requested by a command from a BS.

Figure 4:
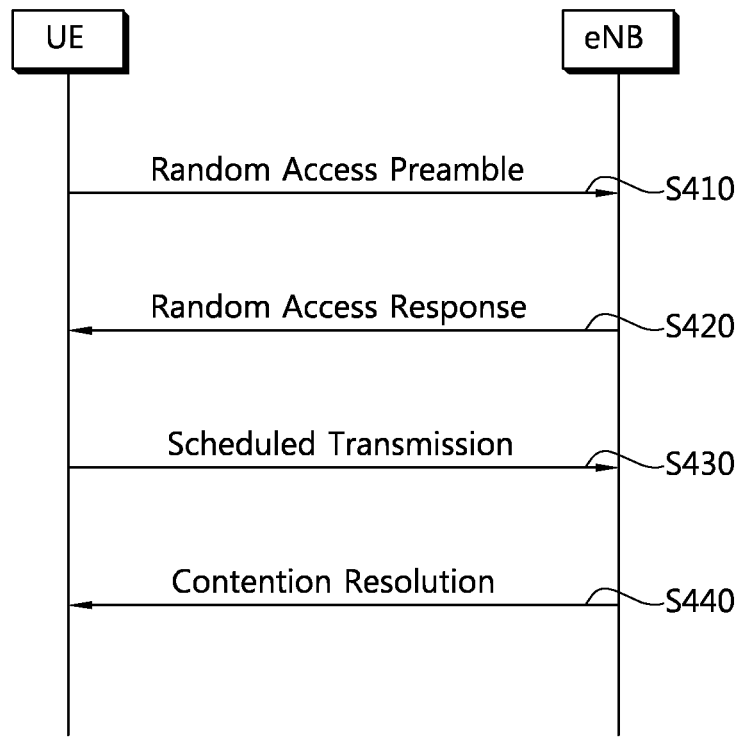
FIG. 4 is a view illustrating an operation process of a user equipment (UE) and a base station (BS) in a contention-based random access procedure.

FIG. 4 is a view illustrating an operation process of a UE and a base station in a contention-based random access procedure.

Step S410 will be described. In the contention-based random access, a UE randomly selects one random access from a set of random access preambles indicated by system information or a handover command, selects a PRACH resource able to transmit the random access preamble, and transmits the same.

Step S420 will be described below. After the random access preamble is transmitted, the UE attempts to receive a random access response thereof within a random access response reception window indicated by the system information or the handover command. In detail, the random access response information is transmitted in the form of a MAC PDU, and the MAC PDU is transferred on a PDSCH. In order to allow the UE to properly receive the information transmitted on the PDSCH, a PDCCH is also transferred together. Namely, the PDCCH includes information regarding a UE which is to receive the PDSCH, frequency and time information of radio resource of the PDSCH, a transmission format of the PDSCH, and the like. When the UE successfully receives the PDCCH destined therefore, the UE appropriately receives the random access response transmitted on the PDSCH according to the information items of the PDCCH. The random access response includes a random access preamble identifier (ID), a UL Grant (uplink radio resource), a temporary C-RNTI, and a time alignment command (TAC). In the above, the reason why the random access preamble identifier is required is because, since a single random access response may include random access response information for one or more UEs, so the random access preamble identifier informs for which UE the UL Grant, Temporary C-RNTI, and TAC are valid. The random access preamble identifier is identical to a random access preamble selected by the UE in Step S410.

Step S430 will be described. When the UE receives the random access response valid therefor, the UE processes the information items included in the random access response. Namely, the UE applies the TAC and stores the Temporary C-RNTI. Also, the UE transmits data stored in a buffer thereof or newly generated data to the BS by using the UL Grant. In this case, an identifier of the UE should be included in the data included in the UL Grant. The reason is because, in the contention-based random access procedure, the BS cannot determine which UEs perform the random access procedure, so in order to resolve collision later, the BS should identify UEs. Also, there are two types of methods for including an identifier of the UE. A first method is that when the UE has a valid cell identifier already allocated in the corresponding cell before the random access procedure, the UE transmits its cell identifier through the UL Grant. Meanwhile, when the UE has not been allocated a valid cell identifier before the random access procedure, the UE includes its unique identifier (e.g., an S-TMSI or a random ID) in data and transmits the same. In general, the unique identifier is longer than a cell identifier. When the UE transmits the data through the UL Grant, the UE starts a contention resolution timer.

Step S440 will be described. After the UE transmits the data including its identifier through the UL Grant included in the random access response, the UE waits for an instruction from the BS for a collision resolution. Namely, in order to receive a particular message, the UE attempts to receive a PDCCH. There are two methods for receiving a PDCCH. As mentioned above, when the identifier of the UE transmitted through the UL Grant is a cell identifier, the UE attempts to receive a PDCCH by using its cell identifier, and when the identifier is a unique identifier, the UE attempts to receive a PDCCH by using the Temporary C-RNTI included in the random access response. Thereafter, in the former case, when a PDCCH is received through its cell identifier before the contention resolution timer expires, the UE determines that the random access procedure has been normally performed, and terminates the random access procedure. In the latter case, when the UE receives a PDCCH through the Temporary cell identifier before the contention resolution time expires, the UE checks data transferred by the PDSCH indicated by the PDCCH. When the data content includes its unique identifier, the UE determines that the random access procedure has been normally performed, and terminates the random access procedure.

Figure 5:
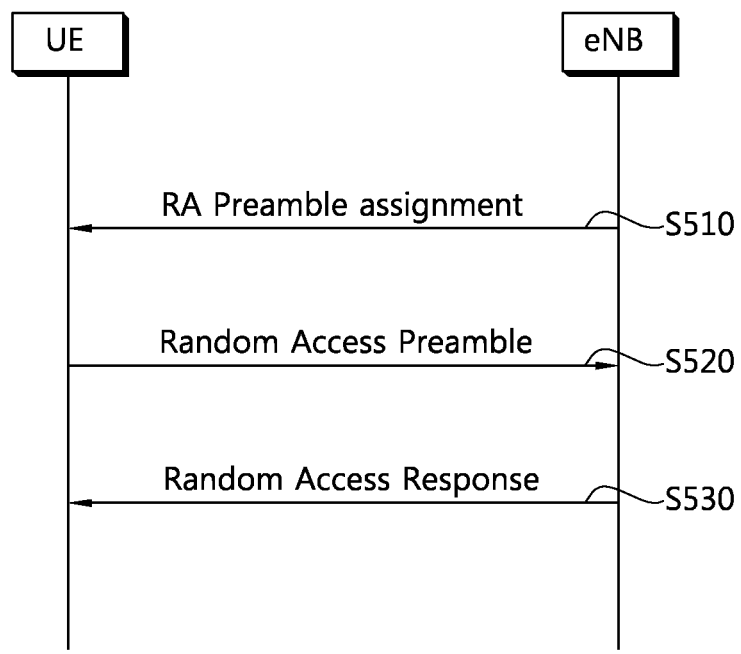
FIG. 5 is a view illustrating an operation process of a UE and a base station in a noncontention-based random access procedure.

FIG. 5 is a view illustrating an operation process of a UE and that a base station in a noncontention-based random access procedure. Additionally, in comparison to the contention-based random access procedure, in the noncontention-based random access procedure, upon receiving random access response information, it is determined that a random access procedure has been normally performed, and the random access procedure is terminated.

Step S510 will be described. As mentioned above, the noncontention-based random access procedure may exist, first, in the case of a handover process, and second, in the case of being requested by a command from a BS. Of course, in the two cases, the contention-based random access procedure may be performed. First, for the noncontention-based random access procedure, it is important to receive a designated random access preamble eliminating a possibility of collision. A method of receiving an indication of the random access preamble includes a handover command and a PDCCH command.

Step S520 will be described. After receiving the allocated random access preamble designated only for the UE, the UE transmits the preamble to the BS.

Step S530 will be described. A method of receiving random access response information is the same as that in the contention-based random access procedure.

A detailed method for collision resolution in a random access procedure will be described.

The reason why a collision occurs in a random access procedure is, basically, because the number of random access preambles is limited. Namely, the BS cannot provide a UE-specific random access preamble to every UE, so the UE randomly select one of the common random access preambles and transmits it. Thus, it may happen that two or more UEs select the same random access preamble and transmits the same through the same PRACH resource, but the BS determines that the random access preamble transmitted by the one or more UEs as a single random access preamble transmitted from one UE. Thus, the BS transmits a random access response to the UE, and predicts that the one UE will receive it. However, a collision may occur as described above, so two or more UEs receive one random access response, and accordingly, each UE performs an operation according to the reception of the random access response. Namely, a problem arises in that two or more UEs transmit different data on the same resource by using the single UL Grant included in the random access response. Thus, all the data transmissions may fail, or the BS may receive only data of a particular UE according to locations or transmission power of the UEs. In the latter case, all the two or more UEs assume that their data transmission has been successful, so the BS should provide information regarding a failure to the UEs which have failed in the contention. Namely, providing information regarding a failure or a success in the contention is called contention resolution. There are two contention resolution methods. One method is using a contention resolution (CR) timer and the other is transmitting an identifier of a successful UE to the UEs. The former case is used when the UE already has a unique cell identifier (C-RNTI) before the random access procedure. Namely, the UE which already has a cell identifier transmits data including its cell identifier to the BS according to a random access response, and operates a CR timer. And, when PDCCH information including its cell identifier is received before the CR timer expires, the UE determines that the UE itself has been successful in the contention, and normally terminates the random access procedure. Reversely, when the UE fails to receive the PDCCH including its cell identifier before the CR timer expires, the UE determines that it has failed in the contention, and re-performs the random access procedure or informs a higher layer about the failure. In the latter case of the CR methods, namely, the method of transmitting the identifier of the successful UE is used when the UE does not have a unique cell identifier before the random access procedure. Namely, when the UE itself does not have a cell identifier, the UE includes a higher identifier (S-TMSI or random ID) than a cell identifier in data according to UL Grant information included in the random access response and transmits the same and operates the CR timer. When data including its higher identifier is transmitted on a DL-SCH before the CR timer expires, the UE determines that the random access procedure has been successful. Meanwhile, when the UE fails to receive data including its higher identifier on a DL-SCH before the CR timer expires, the UE determines that the random access procedure has failed.

Hereinafter, machine type communication (MTC) will be described. MTC is also called object-to-object intelligent network (or O2N).

MTC refers to communication between machines without a human intervention, and a UE used in MTC is an MTC device. MTC is also called by other name such as M2M (Machine to Machine). A service provided through MTC is different from a service in existing communications intervened by a person, and various categories of services exist as follows. For example, service such as tracking, metering, a payment system, medicine (or healthcare), remote controlling, and the like, are provided through MTC.

Figure 6:
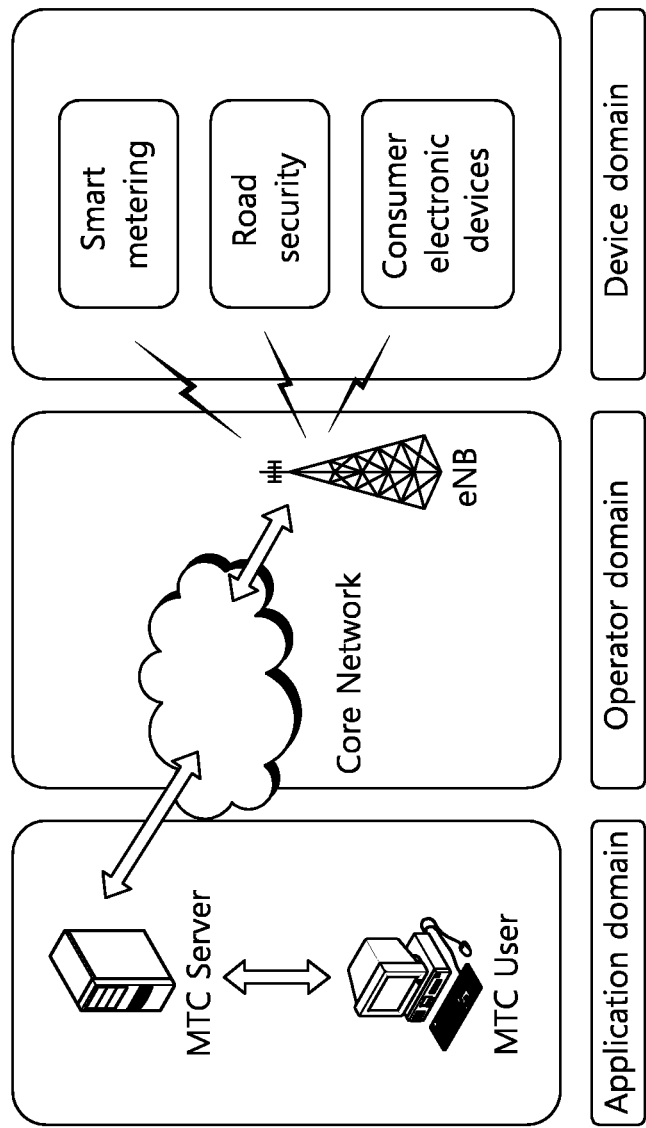
FIG. 6 is a view illustrating a communication system including MTC (Machine-Type Communication).

FIG. 6 is a view illustrating a communication system including MTC (Machine-Type Communication). An MTC device communicates with a different MTC device or an MTC server through a mobile communication network (PLMN). The MTC server may provide services such as metering, road information, user's controlling of electronic device, and the like, to an MTC user.

In order to effectively support the MTC service, characteristics such as low mobility, time tolerance, small data transmission, and the like, may be considered. Also, it may be assumed that numerous MTC devices may exist in a single cell.

On the assumption that numerous MTC devices exist in a single cell, a scenario that numerous MTC devices perform random access in a particular situation may be assumed. When numerous MTC devices perform random access, a system load is increased. Namely, the plurality of MTC devices may transmit backoff to delay a random access re-transmission.

Detailed examples hereinafter solve a delay of random access retransmission by providing a new backoff parameter. Also, a delay of random access re-transmission is solved by improving a random access procedure.

A UE according to an embodiment of the present invention proposed to improve a random access back scheme receives a particular cause-dedicated (i.e., cause-specific) backoff parameter and a cell-common backoff parameter from one cell, and when the UE executes random access due to a particular cause, the UE executes backoff according to the particular cause-dedicated backoff parameter and when the UE executes random access due to a cause other than the particular cause, the UE executes the cell-common backoff parameter. For example, the particular cause may be MTC or a delay tolerant access.

Also, a wireless device executing random access according to an embodiment of the present invention receives a random access response message (i.e., a first random access response message) transmitted by a BS before a transmission of an initial random access preamble, and when there is a backoff parameter in the random access response message, the UE performs backoff and subsequently transmits the first random access preamble. Also, when there is no backoff parameter in the response message, the UE transmits the first random access preamble without backoff, and receives a second random access response message in response to the first random access preamble to check whether or not it is a response to the first random access preamble.

The wireless device may be an MTC UE or a UE with delay tolerant access, and the backoff parameter may be an MTC-dedicated or delay tolerant access-dedicated backoff parameter. When the UE executes random access for MTC or executes random access for delay tolerant access, the UE may execute backoff according to the particular cause-dedicated (i.e., cause-specific) backoff parameter, and when the UE executes random access due to a cause other than the particular cause, the UE may execute backoff according to the cell-common backoff parameter.

Unlike the general cell-common backoff parameter, the particular cause-dedicated backoff parameter may be included in a padding field of a random access response message and transmitted to a UE. A wireless network may include an indicator in a system information block or a random access response message, and inform the UE that the particular cause-dedicated backoff parameter may be included in a random access response message through the indicator.

The wireless device may attempt to receive a random access response with respect to a first random access preamble during a first random access response reception window interval, and attempt to receive a random access response message with respect to a second random access preamble during a second random access response reception window interval. The UE may receive a system information block (SIB) to obtain a length of the time interval of the first random access response reception window and the second random access response reception window. The size of the first random access response reception window may be equal to that of the second random access response reception window.

When the second random access response message indicates a response of the first random access preamble, the wireless device transmits an uplink message and drives a CR timer. When a CR message corresponding to the uplink message is not received until when the CR timer expires, the UE executes backoff by using the backoff parameter and subsequently transmits a second random access preamble. When the UE executes random access for MTC or executes random access for delay tolerant access, the CR timer expires after a particular cause-dedicated (i.e., cause-specific) expiration time, and when the UE executes random access due to other cause, the CR timer expires after a cell-common expiration time.

When the UE according to an embodiment of the present invention receives a backoff parameter, the UE randomly selects a time duration from 0 (i.e., a current time) to a time indicated by the backoff parameter by probability based on a uniform distribution, and delays (backs off) a transmission of a preamble until the selected time.

Figure 7:
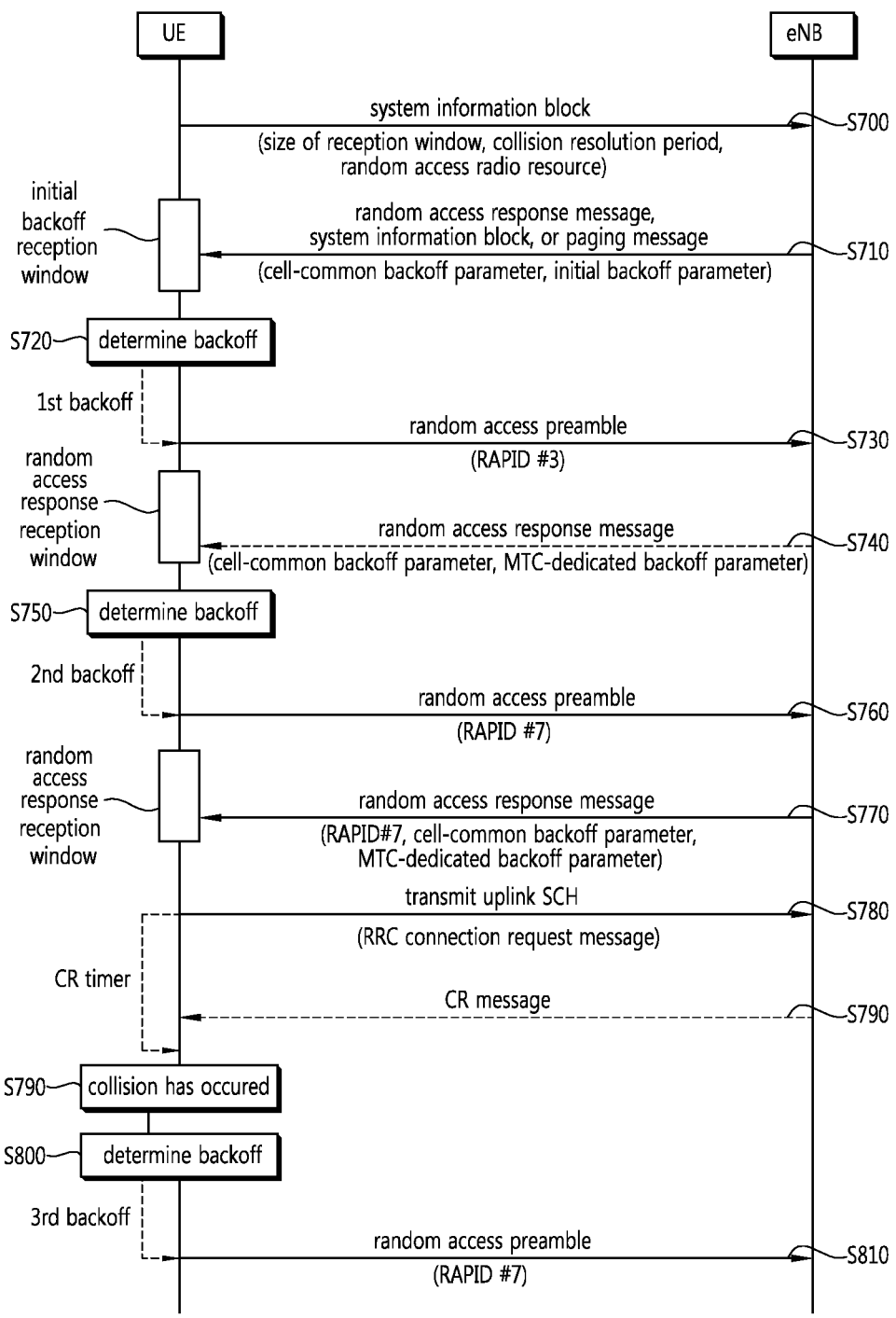
FIG. 7 is a view illustrating an example of a random access procedure.

FIG. 7 is a view illustrating an example of a random access procedure. In the procedure, a UE may be an MTC UE or a UE with delay tolerant access. In this case, the UE sets an establishment cause included in an RRC connection request message according to an indication from the NAS layer. For example, when the NAS layer indicates MTC access, the establishment cause may be set to MTC (or "MTC access"), and when the NAS layer indicates delay tolerant access, the establishment cause may be set to delay tolerant access or "low priority".

Step S700 will be described. First, a UE receives system information to obtain configuration information for random access. The configuration information for random access includes an interval size of an initial backoff reception window, an interval size of a random access response reception window, available random access preambles, uplink resource for random access, an expiration time of CR timer for delay tolerant access and expiration time of cell-common CR timer, and a particular RA-RNTI value for receiving a random access response message.

Step S710 will be described. The UE may receive a random access response message, a system information block (SIB), a paging message, or a DCCH (Dedicated Control Channel) message during an initial backoff reception window to receive a cell-common backoff parameter and an initial backoff parameter. When the UE executes/performs random access for MTC/delay tolerant access, the UE stores the received initial backoff parameter. A size of the initial backoff reception window may be equal to or different from that of a random access response reception window described hereinafter. When the UE receives the random access response message and executes random access for MTC/delay tolerant access, the UE receives a PDCCH in order to receive a random access response message. When the UE receives the particular RA-RNTI through the PDCCH channel, the UE may receive a random access response message according to the received PDCCH to obtain an initial backoff parameter.

When the random access response message is received in step S710, the random access response message is received before a random access preamble is transmitted. Namely, the example of FIG. 7 is an example in which a random access response message is received before an initial random access preamble is transmitted. Unlike the related art, the random access response message is not a response to a random access preamble, so an included RA-RNTI may be discriminated or distinguishable from a conventional RA-RNTI. Namely, in step S710, when an RA-RNTI is transmitted, the RA-RNTI may be configured to have a different format from that of a conventional RA-RNTI.

Step S720 will be described. When the UE executes/performs random access for MTC/delay tolerant access, the UE executes backoff according to an initial backoff parameter. However, when the UE fails to receive the initial backoff parameter during the initial backoff reception window, the UE may not execute $1^{st}$ backoff. Also, although the UE fails to receive the initial backoff parameter during the initial backoff reception window, the UE may perform 1st backoff according to a cell-common backoff parameter. Meanwhile, when the UE executes random access for MTC/delay tolerant access, the backoff execution may start only at a particular time. For example, the UE may execute backoff only at a time designated by an MTC application or when a modification period (MP) of a system information block (SIB) or a repetition period starts.

Step S730 will be described. When backoff is finished, the UE transmits a first random access preamble including randomly selected RAPID (Random Access Preamble ID).

Step S740 will be described. When the UE executes random access for MTC/delay tolerant access, the UE attempts to receive a random access response message by using an RA-RNTI during a random access response reception window. When the UE fails to receive a random access response message including the RAPID during the random access reception window, the UE determines that the initial preamble transmission has failed.

Meanwhile, when the UE receives a cell-common backoff parameter or a dedicated backoff parameter through a certain random access response message during the random access response reception window, the UE updates the backoff parameter with the received parameter. When the UE executes random access for MTC/delay tolerant access, the UE updates the backoff parameter with the dedicated backoff parameter, or otherwise, the UE updates the backoff parameter with a cell-common backoff parameter. Alternatively, when the UE fails to receive the dedicated backoff parameter and receives only the cell-common backoff parameter during a window, the UE updates with backoff parameter with the cell-common backoff parameter.

Meanwhile, the UE may receive a dedicated backoff parameter through system information or a UE-dedicated DCCH message, and store the same.

Step S750 will be described. When the UE fails to receive a random access response message including the RAPID during the random access response reception window, the UE performs 2nd backoff by using the currently stored backoff parameter.

Step S760 will be described. When backoff is finished, the UE transmits second preamble including the randomly selected RAPID (Random Access Preamble ID).

Step S770 will be described. When the UE executes random access for MTC/delay tolerant access, the UE attempts to receive a random access response message by using an RA-RNTI during a random access response reception window. When the UE receives a random access response message including the RAPID during the random access reception window, the UE determines that the second preamble transmission has been successful.

Meanwhile, when the UE receives a cell-common backoff parameter or a dedicated backoff parameter through a certain random access response message during the random access response reception window, the UE updates the backoff parameter with the received parameter. When the UE executes random access for MTC/delay tolerant access, the UE updates the backoff parameter with the dedicated backoff parameter, or otherwise, the UE updates the backoff parameter with a cell-common backoff parameter. Alternatively, when the UE fails to receive the dedicated backoff parameter and receives only the cell-common backoff parameter during a window, the UE updates with backoff parameter with the cell-common backoff parameter.

Meanwhile, the UE may receive a dedicated backoff parameter through system information or a UE-dedicated DCCH message, and store the same.

Step S780 will be described. The UE transmits an RRC connection request message via an uplink SCH channel. Here, the UE sets an establishment cause included in the RRC connection request message according to an indication from the NAS layer. For example, when the NAS layer indicates MTC, the UE sets an establishment cause as MTC, and when the NAS layer indicates a delay tolerant access, the UE sets delay tolerant access or low priority. After the uplink SCH channel is transmitted, the UE starts a CR timer.

Step S790 will be described. When the UE executes random access for MTC/delay tolerant access, the UE executes the CR timer until when an expiration time of the CR timer for the MTC/delay tolerant access expires. Or, otherwise, the UE executes the CR timer until an expiration time of the cell-common CR timer expires. When a CR message corresponding to the RRC connection request message is received until when the timer expires, the collision has been resolved and the random access has been successfully completed. However, when the CR message corresponding to the RRC connection request message is not received until when the timer expires, the UE determines that a collision has occurred.

Step S800 will be described. When a collision has occurred, there is a currently stored backoff parameter and the UE executes 3rd backoff by using the currently stored backoff parameter.

Step S810 will be described. When the backoff in step S800 is finished, the UE transmits a third random access preamble including a randomly selected RAPID (Random Access Preamble ID).

Some of the respective steps illustrated in FIG. 7 may be omitted. Also, order of steps illustrated in FIG. 7 may be changed. According to the embodiment of FIG. 7, two types of backoff parameters (e.g., the cell-common backoff parameter and the particular cause-dedicated backoff parameter) are transmitted to the UE. Examples of methods of including two types of backoff parameters as are as follows.

Figure 8:
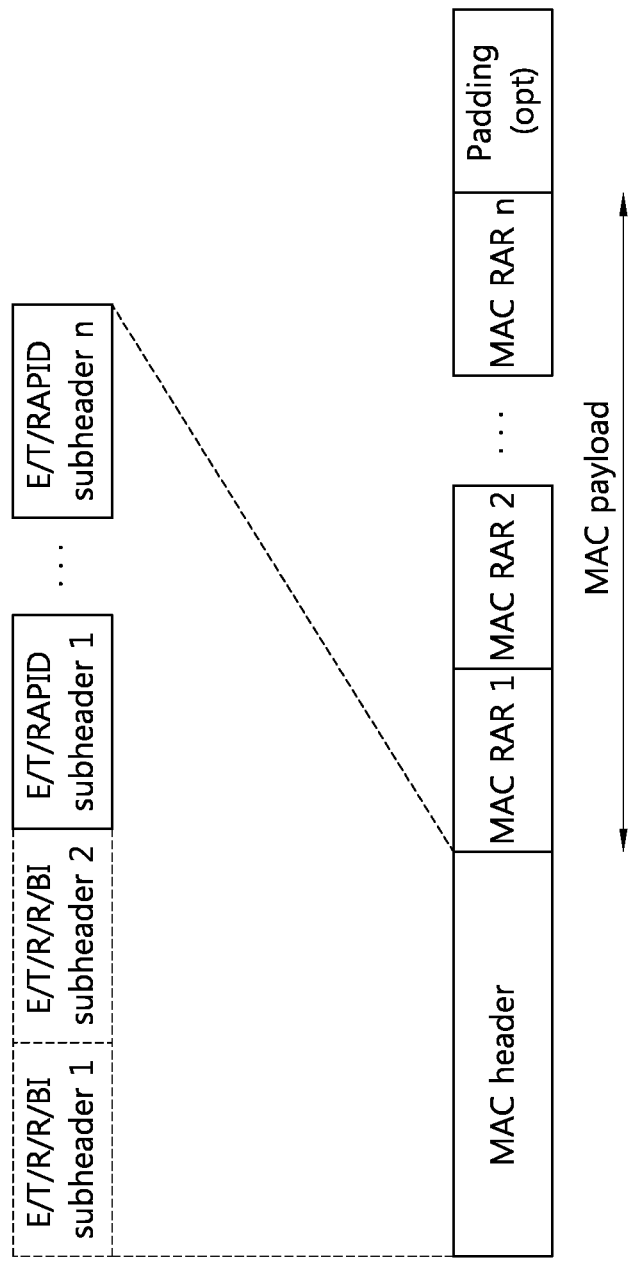
FIG. 8 is a view illustrating an example of a method of including a backoff parameter.
Figure 9:
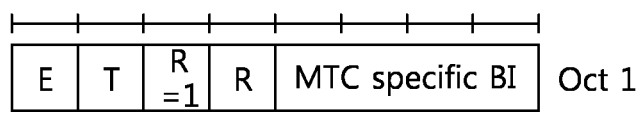
FIG. 9 is a view illustrating an example of a method of including a backoff parameter.

FIGS. 8 and 9 are views illustrating a first example of a method of including a backoff parameter. As illustrated in FIG. 8, two types of backoff parameters may be included in a MAC subheader of a MAC PDU of a random access response message. Namely, a plurality of E/T/R/R/BI MAC subheaders including a backoff parameter may be included in a single MAC PDU. In this case, as illustrated in FIG. 9, one (e.g., E/T/R/R/BI MAC subheader 2) of the E/T/R/R/BI MAC subheaders may include a BI (backoff parameter Indicator) field including a backoff parameter.

Since a backoff parameter is included in a plurality of MAC subheaders, each MAC subheader may indicate any one type of backoff parameter. Thus, when random access is executed for MTC/delay tolerant access, the UE may store a BI of a first E/T/R/R/BI MAC subheader, as a cell-common parameter, and store a BI of a second E/T/R/R/BI MAC subheader, as a dedicated parameter.

Figure 10:
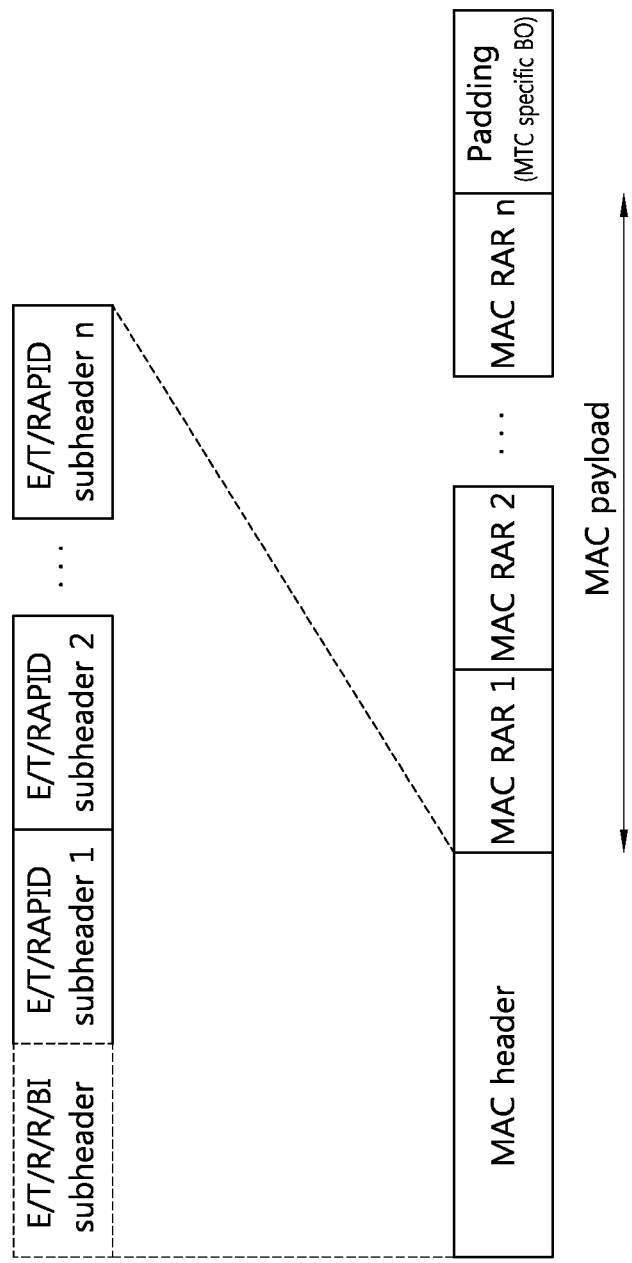
FIG. 10 is a view illustrating an example of a method of including a backoff parameter.

Another method of including a backoff parameter will be described. FIG. 10 is a view illustrating a second example of a method of including a backoff parameter. FIG. 10 provides an example in which a parameter is included in a padding field of a MAC PDU of a random access response message and E/T/R/R/BI MAC subheaders.

In detail, the padding field of FIG. 10 includes an E/T/R/R/BI MAC subheader 2 including a particular cause-dedicated (i.e., cause-specific) backoff parameter. Thus, when a random access for MTC/delay tolerant access is executed, the UE recognizes that the particular cause-dedicated (i.e., cause-specific) backoff parameter can be included in the padding field, and receives the particular cause-dedicated backoff parameter through the padding field and stores the same. There are various methods of indicating that the particular cause-dedicated backoff parameter is included in the padding field. A BI field of the E/T/R/R/BI MAC subheader in a MAC header may inform about the existence of the particular cause-dedicated backoff parameter in the padding field, or a system information block may inform about the existence of the particular cause-dedicated backoff parameter in the padding field.

A different method of including a backoff parameter will be described. Table 1 below shows indexes indicating backoff parameters and backoff values corresponding to the respective indices. When the indices 13 to 15 are determined, the MTC UE or the UE supporting delay tolerant access may a backoff value exceeding 960 ms (e.g., when the index is 13, a backoff value may be determined to 1920 ms).

TABLE 1

| Index | Backoff parameter value (ms) |
|-------|------------------------------|
| 0     | 0                            |
| 1     | 10                           |
| 2     | 20                           |
| 3     | 30                           |
| 4     | 40                           |
| 5     | 60                           |
| 6     | 80                           |
| 7     | 120                          |
| 8     | 160                          |
| 9     | 240                          |
| 10    | 320                          |
| 11    | 480                          |
| 12    | 960                          |
| 13    | Reserved                     |
| 14    | Reserved                     |
| 15    | Reserved                     |

When the indices are determined to 13 to 15, the related art UE not supporting MTC/delay tolerant access determines a backoff value as 960 ms, but a UE supporting MTC/delay tolerant access may be able to perform backoff by a backoff value exceeding 960 ms. Namely, the UE may indicate the cell-common backoff parameter and the particular cause-dedicated (i.e., cause-specific) backoff parameter by using the "Reserved" region of backoff value.

In another example, a backoff parameter may indicate unlimited backoff. When the backoff parameter indicating the unlimited backoff is received during the random access response reception window, an access to a cell may be limited until when a timer expires after it operates. Also, information regarding the timer may be broadcast as system information.

Meanwhile, the backoff parameter may be included in a random access response message. In this case, the backoff parameter may include information regarding access class barring. The information regarding access class barring includes "ac-Barring Factor" and "ac-Barringtime".

The access class barring is a procedure for controlling an access to a cell according to a call type. Based on the access class barring, different classes may be assigned to a call such as an emergency call and a general call. Whether or not a call of a particular class is barred may be controlled by "ac-BarringFactor" and "ac-Barringtime". When a call of a particular class passes access class barring, a random access may be performed with respect to a network, and when access class barring is barred, next access class barring is performed according to an operation of the timer.

When a backoff parameter includes information regarding access class barring (ACB), the UE draws (or selects) 'rand (i.e., random number)' by a uniform distribution between 0 and 1. The UE may determine that a call of a particular class has passed the access class barring by comparing a value indicated by ac-BarringFactor included in the backoff parameter with 'rand'. When 'rand' is smaller than a value indicated in ac-BarringFactor, the UE may determine that access class barring has not been barred. Also, when 'rand' is greater than or equal to the value indicated in ac-BarringFactor, the UE may determine that access class barring has been barred.

Figure 11:
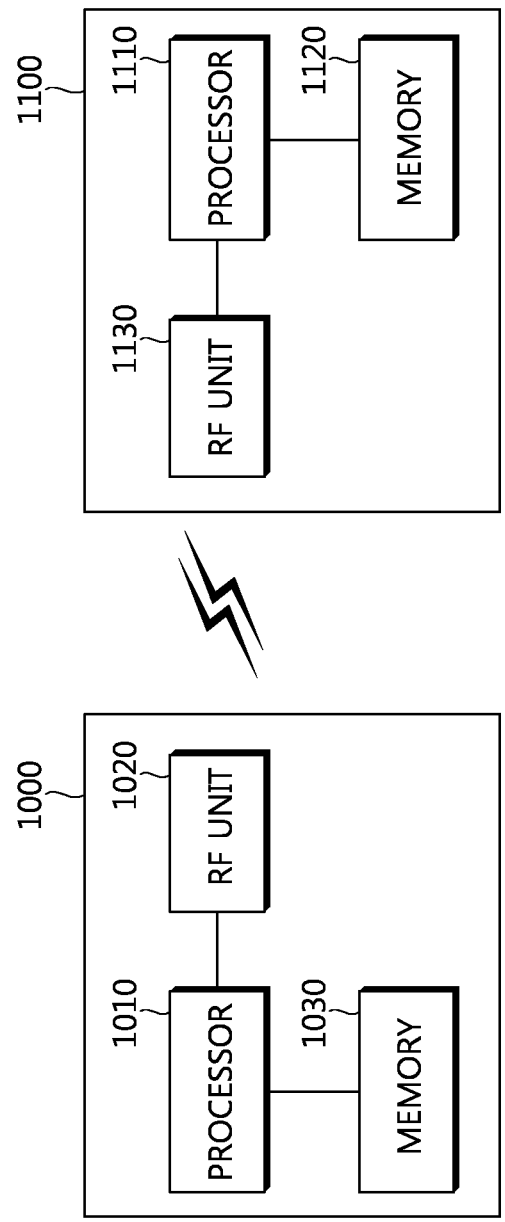
FIG. 11 is a view illustrating a user equipment (UE) and a base station (BS) to which an embodiment of the present invention is applied.

FIG. 11 is a view illustrating a UE and a BS to which an embodiment of the present invention is applied. A UE 1000 includes a processor 1010, a memory 1030, and a radio frequency (RF) unit 1020. The processor 1010 may allocate radio resources according to information provided from the outside, information previously stored therein, and the like. Procedures, techniques, and functions performed by the UE in the foregoing embodiments may be implemented by the processor 1010. The memory 1030, connected to the processor 1010, stores various types of information for driving the processor 1010. The RF unit 1020, connected to processor 1010, transmits and/or receives radio signals.

A BS 1100 communicating with the UE includes a processor 1110, a memory 1120, and a radio frequency (RF) unit 1130. Procedures, techniques, and functions performed by the BS in the foregoing embodiments may be implemented by the processor 1110. The memory 1120, connected to the processor 1110, stores various types of information for driving the processor 1110. The RF unit 1130, connected to processor 1110, transmits and/or receives radio signals.

The processors 1010 and 1110 may include an ASIC (Application-Specific Integrated Circuit), a chip-chip, a logical circuit and/or a data processor. The memories 1030 and 1120 may include a ROM (Read-Only Memory), a RAM (Random Access Memory), a flash memory, a memory card, a storage medium, and/or any other storage devices. The RF units 1020 and 1130 may include a baseband circuit for processing a radio signal. When the embodiments are implemented by software, the foregoing techniques may be implemented by modules (processes, functions, or the like) performing the foregoing functions. The modules may be stored in the memories 1030 and 1120 and executed by the processors 1010 and the processor 1110, respectively. The memories 1030 and 1120 may be provided within or outside the processors 1010 and 1110 and may be connected to the processors 1010 and 1110 through a well-known unit, respectively.

The method and apparatus as described above may be implemented by hardware, software, or a combination thereof. For hardware implementation, the method and apparatus as described above may be implemented by using application specific integrated circuits (ASICs), digital signal processors (DSPs), programmable logic devices (PLDs), field programmable gate arrays (FPGAs), processors, controllers, microprocessors, electronic units, or a combination thereof, designed to perform the foregoing functions. For software implementation, the method and apparatus as described above may be implemented by a module performing the foregoing functions. Software may be stored in a memory unit and executed by a processor. As the memory unit or the processor, various means well known to a person skilled in the art may be employed.

While the present invention has been shown and described in connection with the embodiments, it will be apparent to those skilled in the art that modifications and variations can be made without departing from the spirit and scope of the invention as defined by the appended claims.

The invention claimed is:

1. A method for performing a random access procedure by a user equipment (UE) in a wireless communication system, the method comprising:
    transmitting a first random access preamble to a base station;
    receiving first backoff parameter information from the base station; and
    transmitting a second random access preamble to the base station,
    wherein the second random access preamble is transmitted by using the first backoff parameter information, and the first backoff parameter information is classified into a first type backoff parameter and a second type backoff parameter, and
    wherein the first type backoff parameter is used for cell-common backoff, and the second type backoff parameter is used for particular cause-specific backoff.

2. The method of claim 1, further comprising:
    receiving second backoff parameter information from the base station,
    wherein the second backoff parameter information is received before the first random access preamble is transmitted to the base station, and the second backoff parameter information is classified into the first type backoff parameter and the second type backoff parameter.

3. The method of claim 2, wherein the second backoff parameter information is included in a random access response.

4. The method of claim 1, wherein the first random access preamble includes a randomly selected random access preamble ID (RAPID).

5. The method of claim 1, wherein the first backoff parameter information is included in a random access response received in response to the first random access preamble.

6. The method of claim 1, wherein the particular cause-specific backoff is used when an establishment cause included in a Radio Resource Control (RRC) connection request message is associated with at least one of machine type communication (MTC) and low priority.

7. The method of claim 6, wherein the establishment cause is indicated by a non-access stratum (NAS) layer.

8. The method of claim 1, wherein the first backoff parameter information is included in a Medium Access Control (MAC) Protocol Data Unit (PDU) of the random access response.

9. The method of claim 8, wherein the first type backoff parameter is included in a first subheader of a MAC header, and the second type backoff parameter is included in a second subheader of the MAC header.

10. The method of claim 8, wherein the first type backoff parameter is included in a subheader of the MAC header, and the second type backoff parameter is included in a padding field that follows a MAC payload of the MAC PDU.

11. The method of claim 1, wherein the first backoff parameter information is included in a system information block (SIB) or a paging message transmitted by the base station.

12. The method of claim 1, wherein the second random access preamble is transmitted based on a delay time selected by a uniform distribution between 0 and a parameter value indicated by the first backoff parameter information.

13. A method for performing a random access procedure by a base station in a wireless communication system, the method comprising:
receiving a first random access preamble from a user equipment (UE);
transmitting first backoff parameter information to the UE; and
receiving a second random access preamble from the UE,
wherein the first backoff parameter information is used to transmit the second random access preamble by the UE, and the first backoff parameter is classified into a first type backoff parameter and a second type backoff parameter, and
wherein the first type backoff parameter is used for cell-common backoff, and the second type backoff parameter is used for particular cause-specific backoff.

14. The method of claim 13, further comprising:
transmitting second backoff parameter information to the UE,
wherein the second backoff parameter information is transmitted before the first random access preamble is received from the UE, and the second backoff parameter information is classified into the first type backoff parameter and the second type backoff parameter.

15. The method of claim 14, wherein the second backoff parameter information is included in a random access response.

16. The method of claim 13, wherein the first random access preamble includes a randomly selected random access preamble ID (RAPID).

17. The method of claim 13, wherein the first backoff parameter information is included in the random access response transmitted by the base station in response to the first random access preamble.

18. The method of claim 13, wherein the particular cause-specific backoff is used when an establishment cause included in a Radio Resource Control (RRC) connection request message is associated with at least one of machine type communication (MTC) and low priority.

* * * * *